350-357
3/30/82
4,322,133

United States Patent [19]
Uede et al.
[11] 4,322,133
[45] Mar. 30, 1982

[54] METHOD OF DRIVING ELECTROCHROMIC DISPLAY DEVICE AND ELECTROCHROMIC DISPLAY DEVICE THEREFOR

[75] Inventors: Hisashi Uede, Yamatokoriyama; Kohzo Yano; Hiroshi Hamada, both of Tenri; Hiroshi Nakauchi, Nara; Yasuhiko Inami, Tenri, all of Japan

[73] Assignee: Sharp Kabushiki Kaisha, Osaka, Japan

[21] Appl. No.: 102,432

[22] Filed: Dec. 11, 1979

Related U.S. Application Data

[63] Continuation of Ser. No. 833,653, Sep. 15, 1977, abandoned.

[30] Foreign Application Priority Data

Sep. 16, 1976 [JP] Japan ............................... 51/111381

[51] Int. Cl.³ ............................................... G02F 1/17
[52] U.S. Cl. .................................... 350/357; 340/785
[58] Field of Search ................ 350/357; 340/763, 785; 307/270

[56] References Cited

U.S. PATENT DOCUMENTS 3,839,857 10/1974 Berets et al. ........................ 350/357
3,950,936 4/1976 Oguey et al. ....................... 58/23 R

OTHER PUBLICATIONS

Giglia, "Features of an Electrochromic Display Device", American Cyanamid Co., pp. 1-13, May 1976.

*Primary Examiner*—James W. Davie
*Attorney, Agent, or Firm*—Birch, Stewart, Kolasch and Birch

[57] ABSTRACT

A method of driving an electrochromic display device and the electrochromic display device therefor the latter including an electrochromic display cell having two opposed substrates at least one of which is transparent, a plurality of electrodes respectively applied to the opposed substrates and an electrochromic substance held in contact with said plurality of electrodes between said opposed substrates so as to reversibly vary its light absorbing characteristics by an electric current applied to the electrodes, and a driving circuit coupled to the electrochromic display cell for driving the latter, wherein erasing the display of the electrochromic cell is done in such a manner that the erasing current will be stopped eventually by the electrochromic substance itself in order to secure complete erasure.

3 Claims, 11 Drawing Figures

METHOD OF DRIVING ELECTROCHROMIC DISPLAY DEVICE AND ELECTROCHROMIC DISPLAY DEVICE THEREFOR

This is a continuation of copending application Ser. No. 833,653, filed on Sept. 15, 1977, abandoned.

The present invention relates to a display device and more particularly, to a driving method of a display device (so-called electrochromic display and referred to as ECD hereinbelow) and the display device therefor employing an electrochromic substance (so-called electrochromic substance and referred to as EC substance hereinbelow) held in contact with a plurality of electrodes between two opposed substrates at least one of which is transparent so that the light absorbing characteristics of the electrochromic substance may vary depending on the voltage or current applied to said electrodes.

With the the recent progress in optoelectronics, various optoelectronic devices have been introduced into the field of display devices, of which the electrochromic display device or ECD employing an EC cell has been brought into particular attention because of its low driving voltage for its application as a display device especially for battery-driven electronic appliances and the like.

Figure 1:
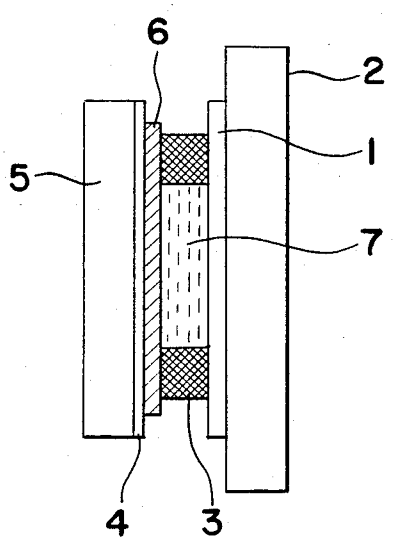

The EC cell which includes an EC substance and is employed in an ECD may be broadly classified into two kinds, one of which employs an inorganic solid film and has a typical construction as shown in FIG. 1. The EC cell of FIG. 1 includes a transparent substrate 5, for example, of glass material, another substrate 2, for example, of stainless steel disposed in spaced and parallel relation to the substrate 5, a transparent electrode 4 applied onto an inner surface of the substrate 5, a film 6 of inorganic material further formed on the surface of the electrode 4, a confronting elctrode 1 applied onto an inner surface of the substrate 2 to face the transparent electrode 4, spacers 3 disposed between the electrodes 4 and 1, and electrolyte 7 accommodated in a space between said electrodes 4 and 1. The inorganic material most commonly employed for the film 6 of approximately 1 μm is amorphous tungsten oxide ($WO_3$), while the electrolyte 7 is a mixed solution of sulfuric acid, alcohol such as glycerin, and white powder of titanium oxide and the like. The alcohol is used for diluting the acid, and the powder is employed to provide a white background for the required coloring phenomenon. Materials suitable for functioning as a display device are selected for the counter electrode 1 which is to be composed of carbon particles and a binding layer. The film 6 of amorphous tungsten oxide is colored blue when the transparent electrode 4 is charged to a negative potential with respect to the counter electrode 1 by an applied voltage of approximately 1.0 to 1.5 volts. If the polarity of the applied voltage is reversed, the film 6 of tungsten oxide returns to the original colorless transparent state. The coloring as described above is attributable to injection of electrons and protons into the film 6 of tungsten oxide, while the color erasing is caused by restoration of electrons and protons into the original state due to the reversing of the polarity of the impressed voltage. The colored state remains as it is for several days even after removal of the voltage impressed for coloring.

Figure 2:
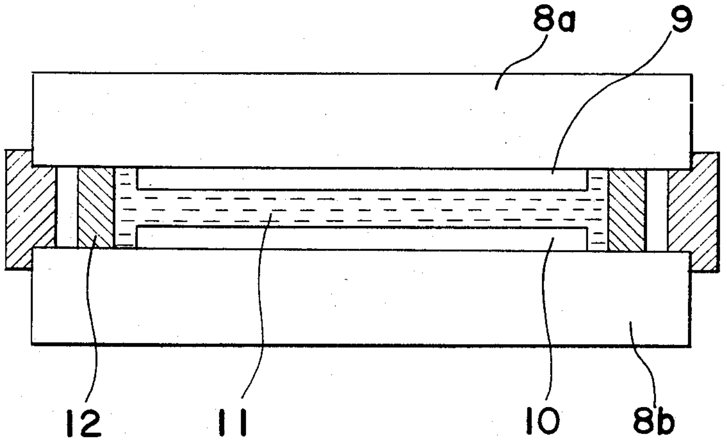

On the other hand, the second kind of ec cell is so arranged as to form an insoluble colored film on a cathode by reducing a colorless liquid through electrochemical reaction. The fundamental construction of the EC cell of the above described type is shown in FIG. 2. The EC cell of FIG. 2 includes a substrate 8*a* of glass material and another substrate 8*b* disposed in spaced relation to the substrate 8*a* through spacers 12, a transparent counter electrode 9 applied onto an inner surface of the substrate 8*a*, a display electrode 10 applied onto an inner surface of the substrate 8*b* to face the electrode 9, and a solution 11 of viologen accommodated in a space between the electrodes 9 and 10 to form a liquid layer of approximately 1 mm thick. It is to be noted that the EC cell employing viologen may be formed into a light transmitting type by employing transparent material for the electrodes 9 and 10 or into a light reflecting type by mixing a reflecting pigment into the solution 11. The insoluble colored film to be formed on the cathode is not subjected to discoloration in the absence of oxygen unless a reverse current is caused to flow therethrough, although gradually discolored in the presence of oxygen. When the polarity of the applied voltage is reversed, however, the colored film is subjected to dissolving, with simultaneous erasing of its color. Included as materials for the EC cell of the above described type are potassium bromide as a supporting electrolyte and a water solution employing heptyl viologen bromide as a substance for forming the colored film. The voltage for operating the EC cell as described above is in the region of 1 volt.

The features of the ECD employing the EC cell as described in the foregoing may be summarized as follows.

(i) The ECD has an extremely wide viewing angle.

(ii) The ECD has good contrast not dependent on the viewing angle.

(iii) In the ECD, several colors may be selected for display.

(iv) The ECD can be driven at a low voltage.

(v) In the ECD, the energy consumption is in the region of several tens m J/cm$^2$ per cycle of coloring and color-erasing, and increases in proportion to the number of cycles.

(vi) The ECD has a memory effect in which the colored state is maintained from several hours to several days even after the voltage for the coloring has been removed.

Figure 3:
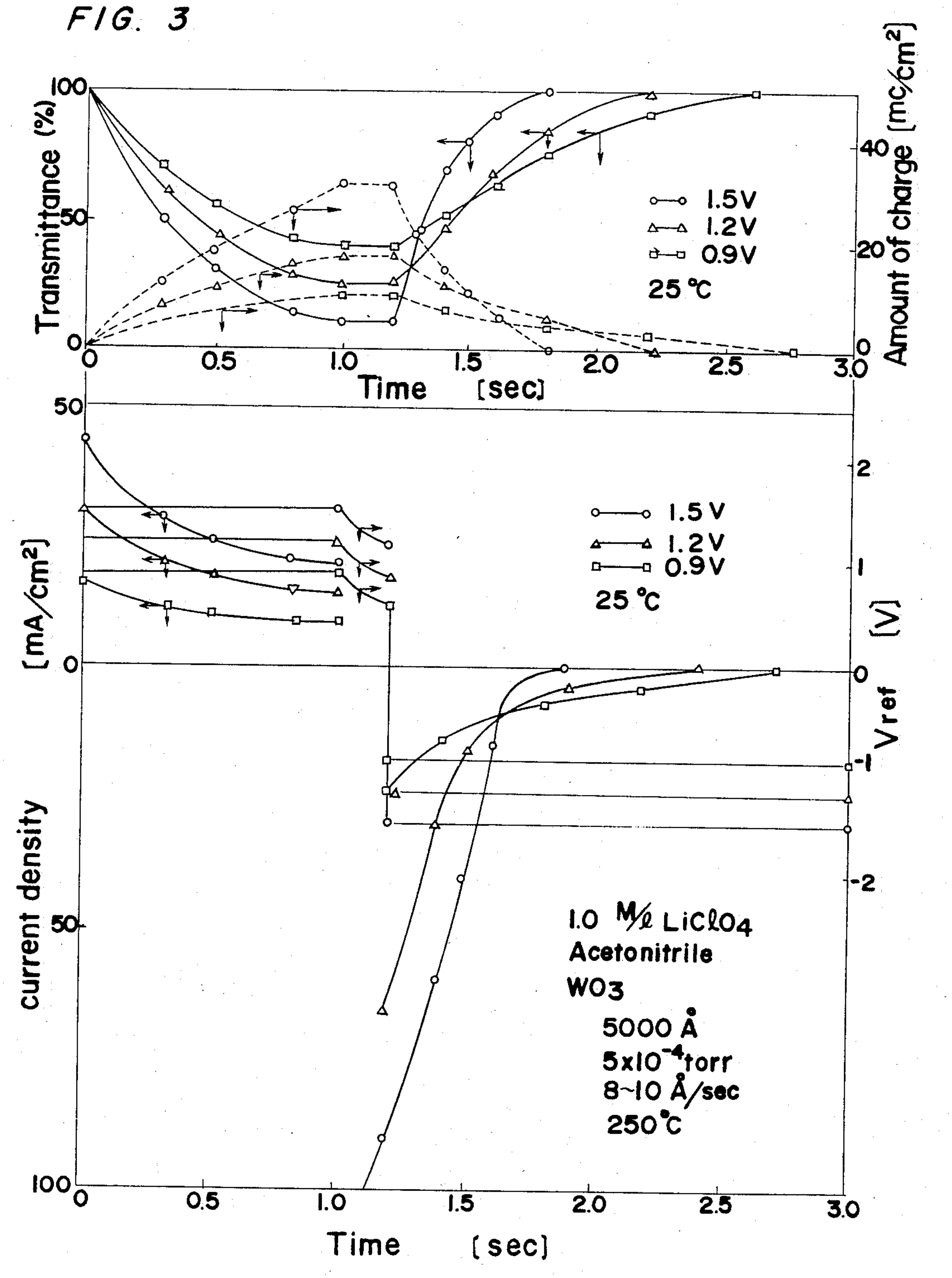

Reference is had to FIG. 3 showing electro-optical characteristics of the EC cell at the time of writing and erasing of display. The EC cell used for measurements is of the kind employing tungsten oxide, and the manufacturing method thereof is described in detail hereinbelow.

Figure 4:
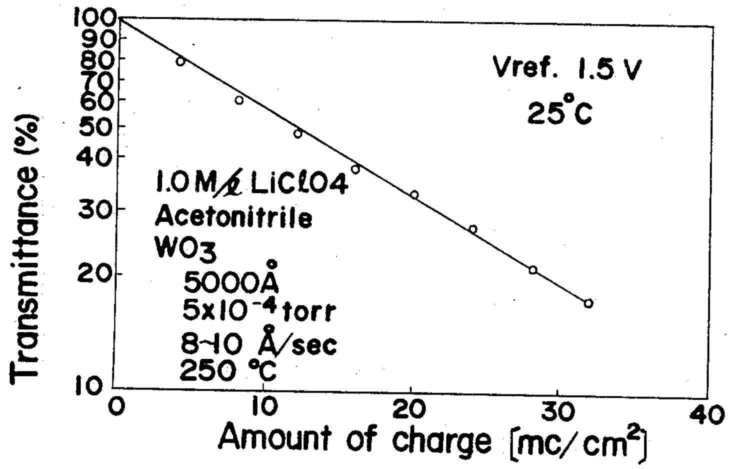

In the first place, onto a transparent substrate made, for example, of soda glass, indium oxide ($In_2O_3$) was deposited to a film thickness of 2000 Å by electron beam evaporation to form a transparent electrically conductive film with surface resistance of 20 Ω/sq on said transparent glass substrate, and subsequently, tungsten oxide ($WO_3$) as the EC substance was further deposited on the transparent electrically conductive film by thermal evaporation under the depositing conditions of substrate temperature of 250° C., film thickness of 5,000 Å, deposition rate of 8 to 10 Å/sec., and pressure of $5\times10^{-4}$ torr with $O_2$ leaked. Over the entire surface of the substrate for the counter electrode, tungsten oxide was deposited, while the substrate for the display electrode was subjected to mask deposition of tungsten oxie only at the display portion thereof, with the electrode leading out portion being covered for protection from electrolytic deterioration by depositing an insulating film, for example, of silicon oxide or by application of epoxy resin. Furthermore, on the display electrode substrate in a position adjacent to the display electrode, there was provided a reference electrode of transparent conductive film for the potentiostatic driving mentioned later. The substrate for the counter electrode and the substrate for the display electrode are bonded to each other by epoxy resin through spacers of glass rod of 1 mm thick, with the electrolyte being enclosed in the space between said substrates. The electrolyte employed was prepared by dissolving lithium perchlorate ($LIClO_4$) into acetonitrile ($CH_3CN$) at a concentration of 1.0 mol/l. For driving the EC cell by the potentiostatic driving method, the potential of the display electrode was set at 0.9, 1.2 and 1.5 volts with respect to the reference electrode, with the polarity being changed over to negative at the time of writing and to positive at the time of erasing. The graphs of FIG. 3 were obtained in such a manner that, after writing for one second, the EC cell was once (for approximately 0.2 second) cut off from a driving circuit to be maintained in the memory state, with subsequent reversing of the polarity for erasing, with the voltage continuously impressed for a short period of time (approximately 2 to 3 seconds) even after the color had disappeared and show the applied voltages and corresponding currents at the time of writing and erasing with time passing. A graph of FIG. 3 also illustrates variations of transmittance and amount of charges against the same axis of time. Meanwhile, shown in FIG. 4 is the relation between the variation of transmittance and the amount of charge, from which it is noticed that optical density (absorbance log 1/T, where T is transmittance and the amount of charge are in a relation proportional to each other, and charges needed for writing and erasing are the same.

With particular reference to the erasing portion in FIG. 3, although the writing time is constant at 1 second, the erasing time, namely, the time required for the EC substance to set back to the original transparent state from the colored state by the impression of erasing voltage, is 1.5 seconds at 0.9 volt, 1.2 seconds at 1.2 volts and 0.7 second at 1.5 volts, and thus it is noticed that more time is required for erasing than for writing when the writing and erasing voltages are the same. Meanwhile, it is also noticed that the erasing current is exponentially reduced from the peak value immediately after the voltage impression, with the time constant about 0.5 second. Upon further increase of the impressed voltage, for example, up to approximately 2 volts, the secondary reaction proceeds through writing and erasing, and the transparent conductive film under the tungsten oxide layer is destroyed, for example, through dissolution and reduction.

From the above facts, the following two methods are brought into consideration as a driving method, especially an erasing method of the ECD. One of such methods is based on a constant driving method in which impression of the erasing voltage is stopped when the difference between the amount of charge for writing and that for erasing becomes zero, since the amount of charge flowing in at the time of writing (such charge amount is proportional to the optical density) is equal to the amount of charge required for erasing, while the other is a driving method in which, when the impressed voltages are the same for writing and erasing, the duration or time for erasing voltage impression is set to be longer than the time for writing voltage impression, or when the time durations are equal for writing and erasing the erasing voltage is set higher than the writing voltage. In the latter method, the erasing current is stopped by the EC substance itself; as EC substance shows high impedance when erased, and does not allow current to flow, thus perfect erasing similar to that in the constant charge driving method is consequently effected.

More specifically, one example of the known constant charge driving circuit will be described hereinbelow with reference to FIGS. 5 and 6.

Figure 5:
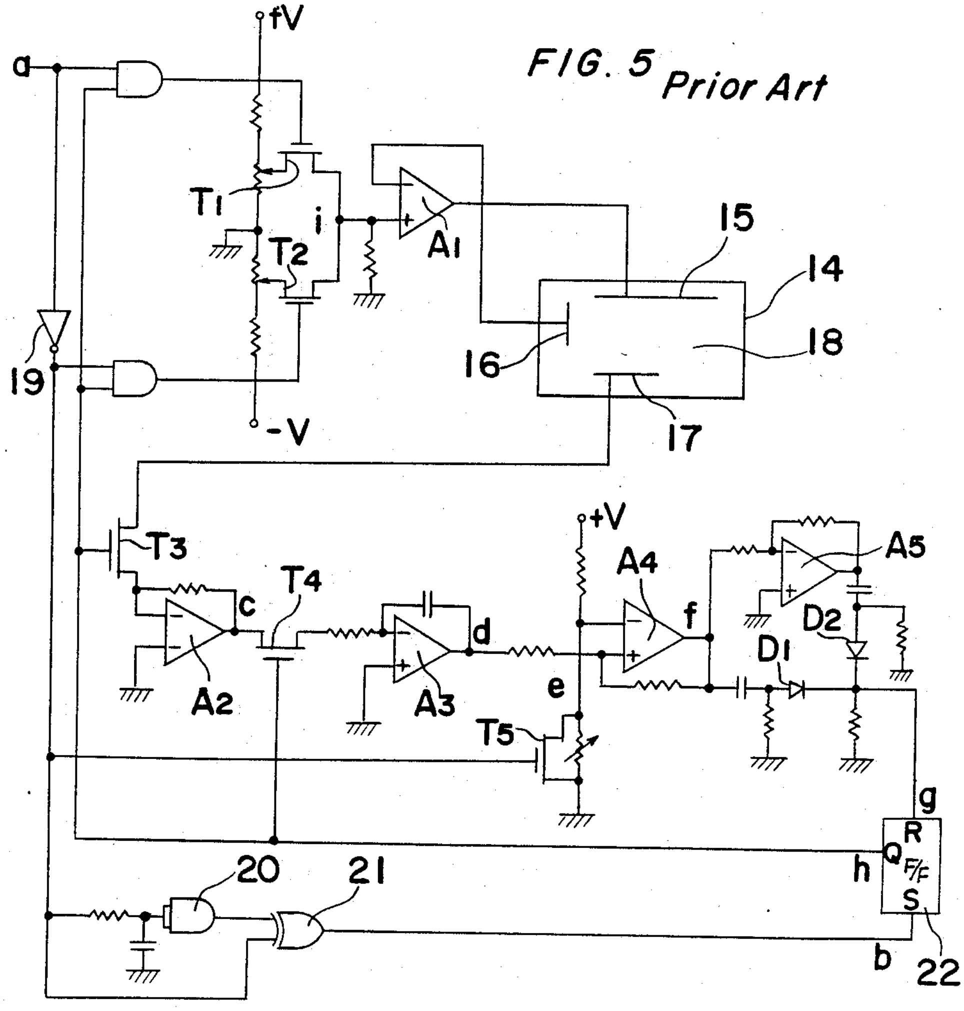
FIG. 5 Prior Art

In FIG. 5, the constant charge driving circuit generally includes an EC cell having a counter electrode 15, reference electrode 16, display electrode 17, and electrolyte 18 contained in a casing 14, and a driving circuitry further including operational amplifiers $A_1$, $A_2$, $A_3$, $A_4$ and $A_5$, and analog switches $T_1$, $T_2$, $T_3$, $T_4$ aand $T_5$ coupled to the EC cell for driving said EC cell. It should be noted here that high level and low level of a display control signal applied to a terminal ⓐ means coloring and erasing respectively. In functioning, on the assumption that the EC cell is initially in the color-erased state, when the display control signal at the terminal ⓐ swings from low level to high level, this signal applied to the driving circuit through an inverter 19, low-pass filter, AND gate 20 and exclusive "or" gate 21 develops a short pulse at portion ⓑ, which pulse brings an RS flip-flop 22 into set state, with portion ⓗ being rendered to be high level. Consequently, the analog switches $T_3$ and $T_4$ are turned ON, while the analog switch $T_1$ is also turned ON by the signal which is the logical product of signals at ⓐ and ⓗ, with a positive voltage set by a variable resistor appearing at ⓘ. On the other hand, the analog switches $T_2$ and $T_5$ are in OFF state, while a positive voltage set by a variable resistor is developed at ⓔ. In the manner as described above, the analog switch $T_3$ is rendered conductive as soon as the display control signal from the terminal a travels from the low level to the high level, withⓐ positive voltage set to be suitable for coloring being developed at portion ⓘ, and thus the display electrode 17 begins to be colored. And then, the current flowing through the ECD via the analog switch $T_3$ is converted by the operational amplifier $A_2$ into a voltage, which is further fed through the analog switch $T_4$ in ON state so as to be integrated in the integrator comprising operational amplifier $A_3$.

Accordingly, a voltage proportional to the amount of charge flowing through the ECD is developed at portion ⓓ. It should be noted here that the voltage level at portion ⓓ before starting of integration for the time of coloring is zero as mentioned later. Incidentally, the current value varies with time as shown in c of FIG. 6, with the integrated value thereof increasing with time as shown in d. It is also to be noted that the operational amplifier $A_4$ is a comparator provided with a small hysteresis. The reference voltage for the comparator is set by a variable resistor and the analog switch $T_5$, and this switch is in OFF state in the case of coloring, and the voltage therefor is set to a value proportional to the amount of charge to be caused to flow, i.e., to a value equal to the integrator output voltage when the EC cell is sufficiently colored with a certain amount of charge corresponding thereto. In the above case, the comparator is actuated when the voltage at portion ⓓ has reached the set reference voltage, and the voltage at portion ⓕ is changed to the positive side. This positive-going transition brings about a positive pulse at portion ⓖ through a high-pass filter and diode $D_1$ to render the RS flip-flop 22 to be in reset state. As a result, the circuit portion ⓗ is rendered to low level so as to turn OFF the analog switches $T_4$ and $T_3$ and further $T_1$. In other words, the integrator is put in the held state, with current being suspended from flowing through the EC cell, and thus the EC cell is kept in the memory state, with the voltage at portion ⓘ reduced to zero. As is seen from the foregoing description, in the case of coloring, the EC cell can be brought into the memory state after coloration by allowing a predetermined amount of charge to flow through the EC cell by placing the display control signal at the terminal ⓐ at the high level. Subsequently, in the case of erasing, the display control signal at the terminal ⓐ which is at high level during the time of coloring is put to low level. As a result, a short pulse is developed at portion ⓑ to bring the RS flip-flop 22 into its set state, while portion ⓗ is placed at high level. Consequently, the analog switches $T_2$ and $T_3$, and also $T_4$ are turned ON, with the analog switch $T_1$ remaining in the OFF state, while the analog switch $T_5$ is turned ON and the reference voltage of the comparator is reduced to zero. Then the EC cell begins to be discolored. But the direction of the current flowing through the EC cell in this case is opposite to that in the case of coloring, thus decreasing the integrator output from the final voltage at the time of coloring. The comparator output swings to the low level side when the level at portion ⓓ is reduced to zero and this variation is inverted to variation toward a high level side by the operational amplifier $A_5$ for further resetting of the RS flip-flop 22 through the high-pass filer and diode $D_2$. As a result, the analog switches $T_4$, $T_3$ and $T_2$ are turned OFF, with the EC cell being electrically cut off, while the integrator is retained with its output at zero to maintain the erased state until the display control signal from the terminal ⓐ is rendered to a high level for the next coloring of the EC cell. In the manner as described above, the color erasing function of the circuit stops at the time when the amount of charge for the color-erasing becomes equal to that for the coloring.

As is seen from the foregoing description, with the circuit arrangement as in FIG. 5, the coloring and color-erasing of the EC cell can be effected by causing a certain predetermined amount of charge to flow through the EC cell. It is to be noted that in the circuit arrangement of FIG. 5, if drift in the integrator during the time of retaining is brought into consideration, it may be so arranged that an analog switch is connected in parallel to the capacitor of the integrator for control thereof by the signal formed by inverting the signal at portion ⓗ, with the reference voltage of the comparator set negative instead of zero for color-erasing. Needless to say, the amounts of charge to flow during the coloring and color erasing may readily be differentiated by suitably altering the reference voltage of the comparator.

It should be noted here, however, that although the constant charge driving circuit as described in the foregoing is ideal in realiability and life due to absence of adverse effects to the EC cell such as discoloration or destruction of electrodes, discoloration or decomposition of electrolyte due to over-writing and over-erasing, etc., the circuit construction tends to be complicated with inevitable increase in cost, for example, due to necessity of the charge detection circuit, integrator, comparator and the like in the driving circuit, thus placing the ECD in a very unfavorable position in the application thereof to various appliances commercially available in the market especially under the present circumstances where there is a keen competition in the ECD against other kinds of display devices.

Accordingly, an essential object of the present invention is to provide an improved driving method for an electrochromic display device (ECD) and the electrochromic display device therefor in which the degree of erasing at the time of erasing is set externally larger than that of writing, while perfect erasing can be effected internally by the EC substance itself.

Another important object of the present invention is to provide a driving method of electrochromic display device (ECD) and the electrochromic display device therefor of the above described type which is free from adverse effects on the EC cell.

A further object of the present invention is to provide a driving method of electrochromic display device and the electrochromic display device therefor which is simple in construction and accurate in functioning, and can be readily incorporated into various electronic appliances at low cost.

A still further object of the present invention is to provide a driving method for an electrochromic display device of the above described type which is applicable to any kind of electrochromic display device.

In accomplishing these and other objects, according to the present invention, the amount of charge passing through the EC cell during the time of erasing display is made larger than that of writing. More specifically, with the voltage polarity for writing reversed for erasing, the duration of voltage impression for erasing is set longer than that for writing, if the voltages for writing and erasing are the same. On the other hand, when the duration of the voltage impression for writing is the same as that for erasing, the erasing voltage is made larger than the writing voltage, with their polarities being reversed. The above arrangement of the present invention in which the duration of erasing voltage impression is made longer than that of writing voltage impression has the advantage that the reflecting rate, at an inoperative OFF state of the EC cell, is not varied as much as in other driving techniques, even when ON and OFF cycles of the EC cell are repeated. Thus an ECD having long life and high reliability is readily obtained through simple construction and at low cost for incorporation into various electronic appliances.

Figure 6:
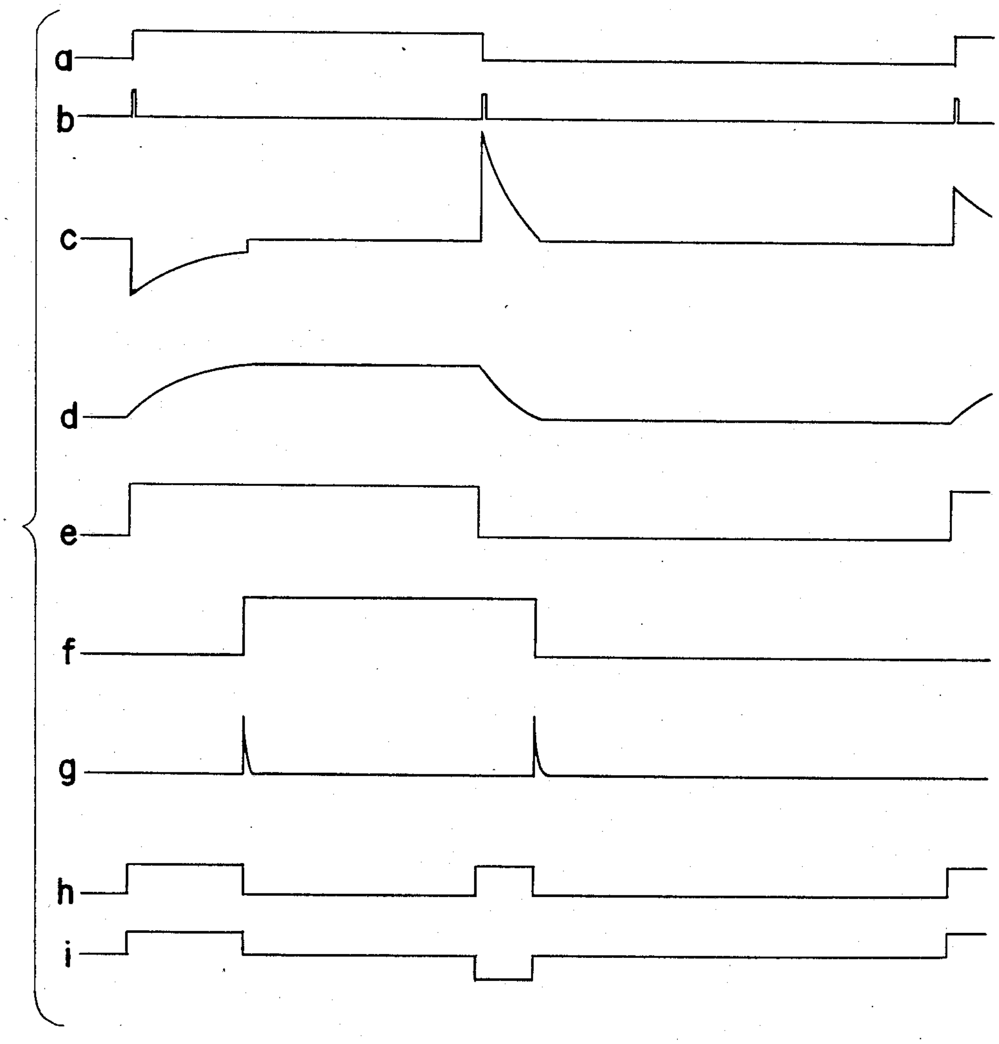
Figure 7:
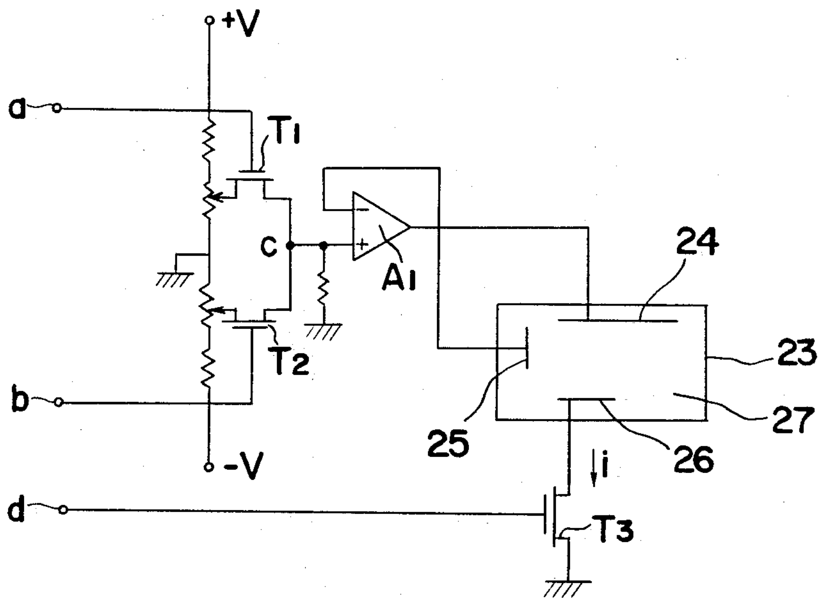

These and other objects and features of the present invention will become apparent from the following description taken in conjunction with the preferred embodiment thereof with reference to the attached drawings in which:

FIG. 1 is a cross sectional view showing a fundamental construction of a solid electrochromic display (ECD) cell already referred to, FIG. 2 is a similar view to FIG. 1, but particularly shows a fundamental contruction of a liquid electrochromic display cell which has also been already referred to, FIG. 3 is a graph showing electro-optical characteristics of the ECD at the time of writing and erasing, FIG. 4 is a graph showing the relation between the variation of transmittance and the amount of charge of the ECD, FIG. 5 is an electrical circuit diagram of a conventional constant charge driving for the electrochromic display cell which has already been referred to, FIG. 6 is a diagram showing signal waveforms at various parts of the circuit of FIG. 5, FIG. 7 is an electrical circuit diagram of a driving circuit according to one preferred embodiment of the present invention.

Figure 8:
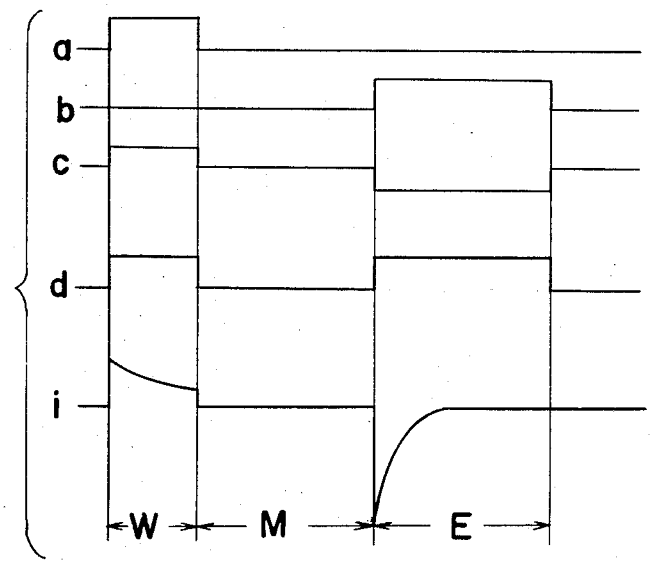
Figure 9:
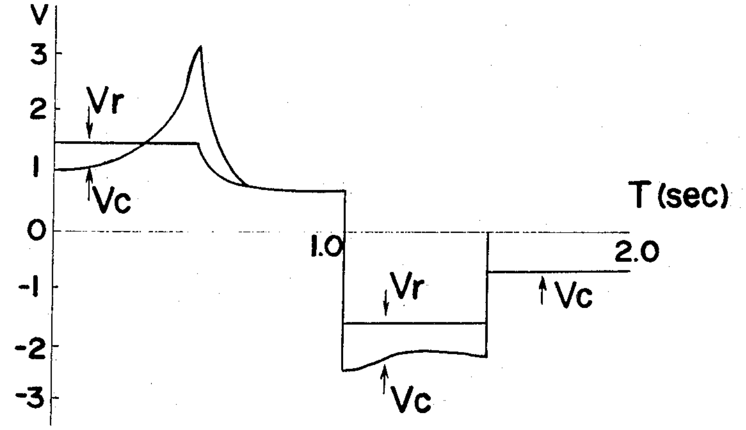
Figure 10:
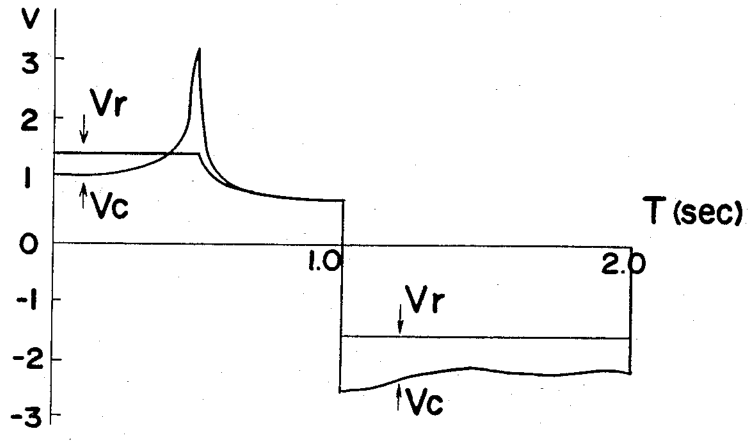
Figure 11:
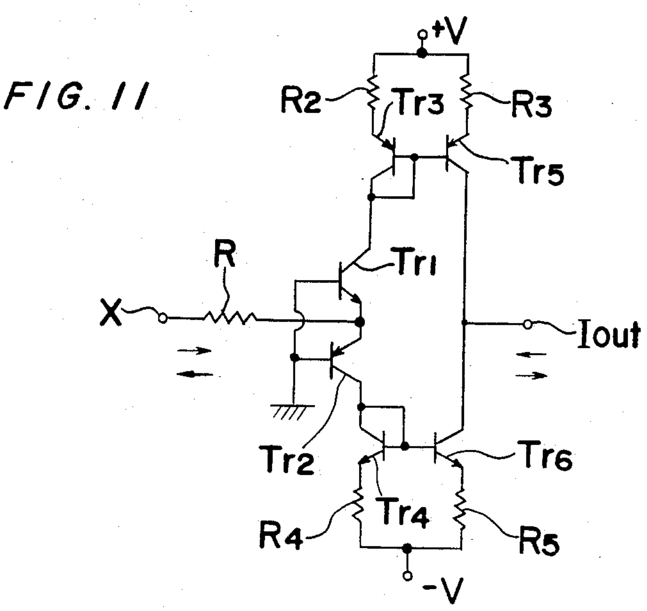

FIG. 8 is a diagram showing signal waveforms at various parts of the circuit of FIG. 7, FIGS. 9 and 10 are graphs showing waveforms of voltages in the potentiostatic driving method related to Example I of the present invention, and FIG. 11 is an electrical circuit diagram of a constant current circuit related to Example II of the present invention.

Before the description of the present invention proceeds, it is to be noted that like parts are designated by like reference numerals throughout several views of the accompanying drawings.

Reference should be made to FIG. 7 showing a circuit construction which is employed in the driving method according to the present invention, and also to FIG. 8 in which waveforms of voltages and the current at various circuit portions in the circuit of FIG. 7 are shown.

In FIG. 7, a circuit including analog switches $T_1$ and $T_2$ coupled, respectively, to circuit portions ⓐ and ⓑ, and series-connected resistors and variable resistors connected at one end to +V and at the other end to −V, is coupled to the plus input terminal of an operational amplifier $A_1$ which is further grounded through a resistor, with the minus input terminal of the amplifier $A_1$ being connected to a reference electrode 25 of an EC cell comprising a casing 23 containing electrolyte 27, while the output terminal of the amplifier $A_1$ is connected to a counter electrode 24 of the EC cell. A display electrode 26 of the same EC cell is connected to ground through an analog switch $T_3$ controlled by the signal at terminal ⓓ. In operation, the analog switch $T_1$ is first turned ON at the time of writing W, and a positive voltage is developed at portion ⓒ, while the analog switch $T_3$ is simultaneously turned ON to cause a current i to flow through the EC cell for coloring. It is to be noted that the length or duration of the writing period W should be set to such an extent as is necessary for the EC cell to obtain sufficient contrast. Upon completion of the writing period W, the analog switch $T_3$ is turned OFF, with the EC cell being kept in a memory state to maintain the colored state, which period is equivalent to the memory period M. For color-erasing, the analog switch $T_2$ is turned ON to feed a negative voltage to the circuit portion ⓒ for allowing a current to flow in a direction opposite to that of the current i. It should also be noted that the present invention is achieved by setting the duration of the erasing period E to be longer than that of the writing period W.

Subsequently, the present invention will be explained more specifically hereinbelow with reference to Examples.

EXAMPLE I

In order to evaluate the difference between the conventional driving method and the driving method according to the present invention, a writing and erasing (ON-OFF) cycle test was carried out as follows by the present inventors.

The EC cell employed for the test had electrodes formed in the manner as described earlier, while the electrolyte therefor was prepared by dissolving lithium perchlorate into Cellosolve acetate ($CH_3COOC_2H_4OC_2H_5$) (name used in trade and manufactured by U.C.C. company of U.S.A.) at a concentration of 1.0 mol/l, with addition of barium sulfate ($BaSO_4$) thereto to impart a white background at a weight ratio of 1:1 for subsequent kneading of the resultant mixture into paste-like form, thus a reflective type EC cell being formed. For assessment of variation with time of the EC cell characteristic, driving conditions are fixed constant to pursue the variation of its reflectivity. The measurement of the reflectivity was based on the integrated intensity of scattered light when monochromatic light of 590 nm was vertically incident on the EC cell. With a measuring apparatus having a spectrophotometer equipped with an inegrating sphere the reflectivity of the EC cell not colored yet is measured with standard white MgO taken as 100%. As a result, it was found that the reflectivity was in the range from 50 to 60%.

For driving, the potentiostatic driving method was employed, while driving conditions set therefor were related to (1) the conventional method in which the durations for the writing voltage impression and the erasing voltage impression were the same at 500 m sec., with the same set voltage of 1.5 volts, while the writing and erasing were repeated by polarity reversing (FIG. 9), and (2) the method as one example of the present invention in which the erasing duration was doubled (1 sec.) with respect to the writing duration for the ON-OFF cycle test, with set voltage conditions remaining the same as in the above conventional method of (1) (FIG. 10). For the test of the characteristic variation with time, the reflectivity of the OFF state was measured to observe the remaining color, the results of which are shown in Table 1 below.

TABLE 1

Variation of reflectivity (OFF time) due to the ON-OFF cycle test

| Driving conditions | Samples | Charge amount | At initial stage |
|---|---|---|---|
| Conventional method: | | | |
| Writing +1.5V 500m sec | A | 27mc | 55% |
| Erasing −1.5V 500m sec | B | 21mc | 55% |
| Method of present invention: | | | |
| Writing +1.5V 500m sec | C | 24mc | 55% |
| Erasing −1.5V 1 sec | D | 24mc | 55% |

| Driving conditions | After 40000 cycles | After 600000 cycles |
|---|---|---|
| Conventional method: | | |
| Writing +1.5V 500m sec | 30% | 29% |
| Erasing −1.5V 500m sec | 37% | 34% |
| Method of present invention: | | |
| Writing +1.5V 500m sec | 47% | 45% |
| Erasing −1.5V 1 sec | 47% | 43% |

From the above Table 1, it is noticed that the reflectivities which were 50 and 60% in the initial non-colored stage when the durations of voltage impression for writing and erasing were the same under fixed voltage set conditions (conventional method represented by samples A and B), dropped down to 29 and 34% after the ON-OFF cycle test, with remaining color being still observed in the EC cell. On the other hand, in the method of the present invention (represented by samples C and D) in which the duration of the erasing voltage impression was made longer than that of the writing, the reflectivities of the OFF state fell down to 43 and 45% without noticeable deterioration of display quality after the ON-OFF test, and that the EC cell was free from any adverse effects, by the increase of the erasing time, such as destruction, decomposition or discoloration of the electrodes and electrolyte.

EXAMPLE II

By employing an EC cell and measuring method similar to those in Example I, ON-OFF cycle test was carried out as in Example I based on the constant current driving method. The constant current driving circuit employed is shown in FIG. 11 in which the input terminal X is connected through a resistor R to the emitters of transistors $Tr_1$ and $Tr_2$ whose bases are connected to each other for grounding, while collectors of the transistors $Tr_1$ and $Tr_2$ are respectively connected to the collectors of transistors $Tr_3$ and $Tr_4$. The bases of the transistors $Tr_3$ and $Tr_4$ are coupled, respectively, to the collectors of the same transistors $Tr_3$ and $Tr_4$ and also to the bases of transistors $Tr_5$ and $Tr_6$ whose collectors are connected to each other for further connection to the output terminal $I_{out}$ out. The emitters of the transistors $Tr_3$ and $Tr_5$ are coupled to $+V$ through resistors $R_2$ and $R_3$ respectively, while the emitters of the transistors $Tr_4$ and $Tr_6$ are also connected to $-V$ through resistors $R_4$ and $R_5$ respectively.

It should be noted that in using the circuit of FIG. 11, the voltage to be impressed was suppressed by limiting the power source voltage to up to 3 volts for preventing destruction and deterioration of the EC cell element. Regarding the set conditions, for an example of the conventional method, the durations of voltage impression for writing and erasing were set to be the same at 250 m sec., with the current value fixed at 9 mA, while for an example of the method according to the present invention, only the erasing time was set to be 1 sec. with other conditions remaining the same as in the above conventional method. The results of these tests are given in Table 2 below.

TABLE 2

Variation of reflectivity (OFF state) due to ON-OFF cycle test

| Driving conditions | Samples | Charge amount | At initial stage |
|---|---|---|---|
| Conventional method: | | | |
| Writing 9mA 250m sec | E | 21mc | 55% |
| Erasing 9mA 250m sec | F | 21mc | 55% |
| | G | 21mc | 55% |
| Method of present invention: | | | |
| Writing 9mA 250m sec | H | 20mc | 55% |
| Erasing 9mA 1.0 sec | I | 21mc | 55% |
| | J | 20mc | 55% |

| Driving conditions | After 40000 cycles | After 600000 cycles |
|---|---|---|
| Conventional method: | | |
| Writing 9mA 250m sec | 36% | 31% |
| Erasing 9mA 250m sec | 36% | 33% |
| | 31% | 32% |
| Method of present invention: | | |
| Writing 9mA 250m sec | 44% | 41% |
| Erasing 9mA 1.0 sec | 40% | 36% |
| | 43% | 37% |

From the results in the above Table 2, it is noticed that in the example of a conventional method (represented by samples E, F and G) in which duration of the writing time is the same as that of the erasing time, insufficiently erased remaining color is observed immediately after completion of the ON-OFF cycle of 40,000 times, with a further decrease of the reflecting rate after completion of the ON-OFF cycle of 600,000 times, while in the method of the present invention (represented by samples H, I and J) in which the erasing time is longer than the writing time, the color is still almost completely erased after completion of the first ON-Off cycle of 40,000 times, with the degree of the remaining color being quite small in visual examination. Although a further decline is noticed after completion of the ON-OFF cycles of 600,000 times, the extent of such a further decline is considerably small compared with that in the conventional method. It should also be noted that in the above driving method according to the present invention, the EC cell was free from any problems resulting from the increase of the erasing time such as destruction, decomposition or discoloration of the electrodes and electrolyte as in Example I.

As is clear from the foregoing description, according to the driving method for electrochromic display devices and the electrochromic device therefor of the present invention, which is characterized in that the amount of charge to be impressed to the EC cell at the time of erasing is made larger than the amount of charge to be applied to the EC cell at the time of the writing, the ECD of simple construction can be operated adequately with long life and high reliability without adverse effects to the EC cell, while the ECD is particularly suited to incorporation into various electronic appliances at low cost.

Although the present invention has been fully described by way of examples with reference to the attached drawings, it is to be noted that various changes and modifications are apparent to those skilled in the art. Therefore, unless otherwise such changes and modifications depart from the scope of the present invention, they should be construed as included therein.

What is claimed is :

1. A driving circuit for driving an electrochromic display cell to conduct coloration operations and bleaching operations thereon, said cell including a counter electrode, segment electrodes, and an electrochromic substance contained therebetween, comprising:

at least two driving terminal means for receiving driving voltages applied thereto;

voltage divider means connected to said driving terminal means for developing said driving voltages and for applying said driving voltages to said driving terminal means;

switching means connected to said segment electrodes of said electrochromic display cell for presenting first and second switched states thereto corresponding, respectively, to said coloration and bleaching operations; and control means for controlling the time for conducting said coloration and bleaching operations on said electrochromic display cell by controlling the switching of said switching means between said first and second switched states such that the quantity of electrical charge passing through said cell during said bleaching operation is greater than the quantity of electrical charge passing through said cell during said coloration operation;

said control means in said bleaching operation maintaining said switching means in said second state for a period of time sufficient to permit the resistance of said electrochromic substance to increase and preclude the passage of said electrical charge through said cell.

2. A driving circuit in accordance with claim 1, wherein said driving circuit comprises constant voltage driving circuit means for maintaining the voltage across said display cell constant.

3. A driving circuit in accordance with claim 1, wherein said driving circuit comprises constant current driving circuit means for maintaining the voltage across said display cell constant, said electrochromic display cell further including reference electrode means for sensing the charge passing through said display cell.

* * * * *